(12) United States Patent
Kokkonen

(10) Patent No.: US 6,606,296 B1
(45) Date of Patent: Aug. 12, 2003

(54) DATA TRANSMISSION METHOD AND RADIO SYSTEM

(75) Inventor: Mikko Kokkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/331,936

(22) PCT Filed: Jan. 15, 1998

(86) PCT No.: PCT/FI98/00031

§ 371 (c)(1),
(2), (4) Date: Jun. 29, 1999

(87) PCT Pub. No.: WO98/34381

PCT Pub. Date: Aug. 6, 1998

(30) Foreign Application Priority Data

Jan. 16, 1997 (FI) .................................................. 970185

(51) Int. Cl.⁷ ................................................ H04J 11/00
(52) U.S. Cl. ...................... 370/203; 370/343; 370/208; 370/204
(58) Field of Search ................................. 370/203, 204, 370/208, 210, 343, 344, 206; 375/325, 150, 130

(56) References Cited

U.S. PATENT DOCUMENTS

| 5,053,860 A | 10/1991 | Tsinberg |
| 5,214,501 A | 5/1993 | Cavallerano et al. |
| 5,682,376 A * | 10/1997 | Hayashino et al. ......... 370/206 |
| 5,694,389 A * | 12/1997 | Seki et al. .................. 370/208 |
| 5,764,706 A * | 6/1998 | Carlin et al. ................ 370/203 |
| 5,867,478 A * | 2/1999 | Baum et al. ................ 370/203 |
| 5,914,933 A * | 6/1999 | Cimini et al. ............... 370/208 |
| 6,192,068 B1 * | 2/2001 | Fattouche et al. .......... 375/130 |
| 6,219,334 B1 * | 4/2001 | Sato et al. .................. 370/210 |

FOREIGN PATENT DOCUMENTS

| EP | 0 497 395 | 8/1992 |
| EP | 0 571 005 | 11/1993 |

OTHER PUBLICATIONS

Copy of International Search Report for PCT/FI98/00031.

\* cited by examiner

*Primary Examiner*—Nguyen T. Vo
*Assistant Examiner*—John Lee
(74) *Attorney, Agent, or Firm*—Squire, Sanders & Dempsey L.L.P.

(57) ABSTRACT

The invention relates to a data transmission method and a radio system comprising at least one base station and a subscriber terminal. In this method each transmitter places reference carriers by an OFDMA moldulator in a band in use substantially randomly, whereby a receiver can use the reference carrier signal for synchronization.

10 Claims, 2 Drawing Sheets

DATA TRANSMISSION METHOD AND RADIO SYSTEM

FIELD OF THE INVENTION

The invention relates to a data transmission method used in a radio system comprising at least one base station and a subscriber terminal which modulate a signal to be-transmitted on subcarriers of a multicarrier modulation and transmit a reference signal in a band in use by using reference carriers formed by the multicarrier modulation.

The invention further relates to a radio system comprising at least one base station and a subscriber terminal comprising a transmitter and a receiver arranged to multicarrier modulate a signal to be transmitted on subcarriers and to transmit and receive a reference signal which is multicarrier modulated on reference carriers.

BACKGROUND OF THE INVENTION

In an OFDMA method (Orthogonal Frequency Division Multiple Access) a spread-coded string of symbols of a signal to be transmitted is modulated on subcarriers which are preferably distributed into a broad frequency band. OFDMA modulation is typically conducted by performing an inverse Fourier transform.

In prior art solutions a pilot signal is also transmitted in the radio system using reference carriers by which, for example, synchronization is facilitated and a channel estimate is formed. The reference carriers are added to the frequency band of the data to be transmitted. A predetermined symbol or sequence of symbols, whose number of symbols corresponds to the number of subcarriers, is transmitted on the reference carriers. Each subcarrier transmits the same reference symbol in each time slot which makes it easy to distinguish the reference symbols from the OFDM symbols of simultaneously transmitted data.

Transmitting and receiving the OFDMA signal allows the use of differential coding and detection, whereby there is no need to form a channel estimate. The performance of differential detection is, however, inferior to that of coherent detection in which the locking takes place into the phase of a received signal.

In coherent reception a channel estimate can be formed for each subcarrier of a data signal by interpolating at time and frequency level the reference carrier transmitted in the immediate surroundings of the subcarrier. Such a local interpolation to form the channel estimate, however, significantly degrades a bit error ratio compared with an ideal channel estimation. When the channel features slowly change compared with the duration of the data symbol, the decisions made from previous symbols can also be utilized when the channel estimate is formed. However, the channel estimator operating by decision feedback is not possible because the estimator needs initial values for estimates in order for the decision-making to be meaningful. Furthermore, the channel estimator cannot be applied to systems using frequency hopping.

BRIEF DESCRIPTION OF THE INVENTION

An object of the present invention is to implement a coherent signal reception in a radio system using multicarrier modulation, in which radio system a channel estimate is formed without interpolation or estimation from previous symbols. Another object is to enable coherent reception also in a system using frequency hopping.

This is achieved with a method of the type set forth in the preamble, characterized in that reference carriers are substantially randomly placed in a band in use.

A radio system of the invention, characterized in that a transmitter of the radio system is arranged to substantially randomly place reference carriers into a band in use.

Great advantages are achieved with the method of the invention. The space of a data transmission channel can be accurately estimated enabling the use of coherent detection at a receiver.

BRIEF DESCRIPTION OF THE DRAWINGS

In the following the invention will be described in greater detail with reference to examples in the accompanying drawings, in which.

DETAILED DESCRIPTION OF THE INVENTION

The solution of the invention is particularly applicable to an OFDMA or OFDMA/CDMA radio system without restricting thereto.

In a CDMA method (Code Division Multiple Access) a narrowband data signal of a user is multiplied by a spreading code having a considerably higher frequency than the data signal into a relatively broad frequency band. In connection with multiplication the data signal spreads into the entire available band. All users simultaneously transmit using the same frequency band. It is aimed to select the spreading codes so that they are substantially orthogonal among themselves, i.e. correlate as little as possible with each other.

In a CDMA receiver implemented in a conventional way the data signal is shifted at the receiver into the original band by multiplying it again by the same spreading code as in the transmission phase. The signals of other users complicate the detection of a desired signal by distorting a received signal. This interference users cause one another is called multiple access interference.

Figure 1:
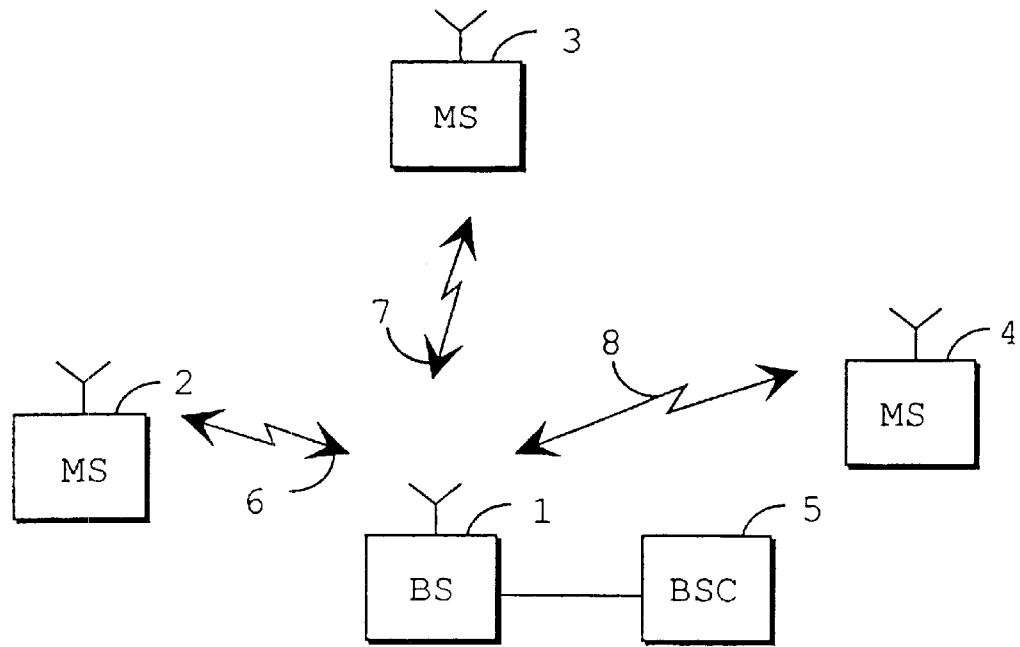
FIG. 1 shows a radio system.

FIG. 1 shows a typical digital radio system comprising a base station 1, subscriber terminals 2–4 and a base station controller 5. The base station 1 communicates with the subscriber terminals 2–4 by signals 6–8. The base station 1 communicates with the base station controller 5 by a digital transfer link 9. The subscriber terminal 2–4 is usually a mobile phone. The signals 6–8 between the base station 1 and the subscriber terminals 2–4 comprise digitised information which is speech or data information produced by the subscribers or control information produced by the radio system.

Let us now examine in more detail the method of the invention, the solution of which is based on a CDMA/OFDMA method. A CDMA-type spreading of a reference or data signal is implemented in the inventive method, for example, in such a manner that each symbol to be transmitted comprising a bit or combination of bits Is multiplied by a spreading code V having a higher frequency than the symbol frequency to be transmitted. The spreading codes V are preferably e.g. Walsh-Hadamard codes which are substantially orthogonal in relation to one another, i.e. the correlation between them is as little as possible. The spread-coded reference and data symbols are preferably connected to a continuous spread-coded string of symbols by summing. Mathematically this can be shown as follows:

$$U = \sum_{i=1}^{K} b_i V_i = [u_0, u_1, \ldots, u_{N_s-1}], \quad (1)$$

where $N_s$ is the length of the spreading code $V_i$ and $b_i$ denotes the bits of the transmission by mapping $b_i \in [-1, 1]$.

The OFDM signal can, in turn, be shown in the following form:

$$y(nt_s) = (-1)^n \sum_{i=0}^{L-1} \sum_{i=0}^{N_s-1} H_i^1 u_i^i e^{j2\pi f_{1N_s+i}t} + N(t), \quad (2)$$

where $$f_{1N_s+i} = f_0 + \frac{1N_s + i}{T_s},$$

$T=T_s+\delta$, $\delta$ is protection time, N is a total amount of subcarriers of the multicarrier modulation, $T_s$ is the duration of the symbol, $N(t)$ is noise summed into the signal, $t_s$ is a sampling frequency and $f_0$ is a frequency of the lowest carrier. It should be observed that the set $[H_i^1 \ u_i^1]$ is a discrete Fourier transform (DFT) of the set of signals $$\left[ y(nt_s) \frac{(-1)^n}{N} \right].$$

The subcarriers of the CDMA/OFDMA radio system are formed according to prior art from the signal to be transmitted, for example, by a discrete inverse Fourier transform. Thus, the DFT implements a filter bank at the receiver, each filter in the bank being arranged to a multiplexed subcarrier. The DFT transform is preferably implemented according to prior art as a fast Fourier transform, or an FFT transform. An OFDMA signal can thus be formed by the FFT transform. When protection time δ; which is longer than a channel impulse response, is preferably reserved between each symbol, the symbols are not mixed in the reception since the channel features slowly change compared with the duration of the symbol. The CDMA/OFDMA technique is described in greater detail, for example, in the publication: Performance of CDMA/OFDMA for Mobile Communication System, Khaled Fazel, IEEE ICUP' 93, pp. 975–979, 1993, which is incorporated herein as reference.

When the CDMA/OFDMA signal according to the invention is received it is OFDMA-demodulated preferably for instance as an FFT transform, and is co-detected using a solution of principle:

$$\hat{x} = sgn H^{-1} y = R^{-1} \tilde{y}, \quad (3)$$

where $\hat{x}$ is the symbols/bits of the transmitted reference or data signal, $H^{-1}$ is an inverse matrix of a cross correlation matrix of the spreading codes V, y is a received signal e.g. at the output of a matched filter, $R^{-1}$ is a normalized cross correlation matrix and $\tilde{y}$ is a normalized output of a matched filter, the matched filter being usually used at the receivers to fix signal distortions caused by the channel.

Let us now examine in more detail the solution of the invention. The reference carriers are substantially randomly placed in a band in use. Randomness or more precisely pseudo-randomness is implemented by generating random figures, by which a desired amount of possible carriers in the band in use is referred to. Reference carriers are used for coherent reception and their frequencies are determined for example by a linear congruential generation formula:

$$f_n = (af_{n-1} + b) \bmod N, \quad (4)$$

where a and b are constants, N is a maximum amount of carriers in the band in use, $f_n$ is a reference number determining the frequency of a desired reference carrier and $f_{n-1}$ is a reference number determining the frequency of the desired reference carrier formed during previous iteration. A predetermined amount P of carriers is selected, the amount being smaller than the maximum amount N of carriers, i.e. P<N. An initial value, or the first value of the iteration, for the reference number $f_{n-1}$ can be freely chosen. Different initial values lead to different pseudo-random placement of the reference frequencies in the band in use. From the entire band to be used N separate carrier frequencies, to which the reference number refers, can be indicated. As an example of how the reference numbers can be used, a 100 MHz frequency area in the range of 800 MHz–900 MHz can be divided into N=1001 possible different carrier frequencies having specific reference numbers; 800 MHz (reference number 1) 800, 1 MHz (reference number 2), . . . and 900 MHz (reference number 1001). The reference numbers do not have to be in order of magnitude with the frequency it refers to, but the reference numbers can refer to frequencies also in an arbitrary order. Whichever way reference is made, a carrier frequency can be determined by forming a reference number between 1–1001. The reference carriers are most preferably placed evenly in the band in use, whereby all parts of the band in use contain statistically as many carriers. This improves the quality of the connection as the fading depends on the frequency.

The randomness is alternatively implemented using M sequences (Maximum length sequence). The M sequences are not entirely orthogonal, but they have a narrow auto-correlation peak. The M sequences are formed according to prior art by shift registers that have feedback taps. When the length of a shift register is n, the length of a sequence is $2^n-1$. The reference carriers are placed in a band in use by using M sequence in such a manner that the number of reference carriers in the band is predetermined and the predetermined consecutive bits of the M sequence form the reference number determining the frequency of the reference carrier in the same way as using the linear congruential generation formula (4).

In the preferred embodiment of the invention the reference carriers are also frequency hopped, whereby the frequencies of the reference carriers are formed in a way according to the linear congruential formula (4) or anew by the M sequences after a predetermined period of time. The frequencies of the reference carriers are changed in frequency hopping preferably symbol by symbol.

The reception of the solution of the invention is, in turn, implemented in such a manner that a channel estimate is formed utilizing different reference carriers for coherent detection by which for instance a data signal is detected. To form the channel estimate a correlation is first calculated between the symbols received on the reference carriers and the reference symbols. This correlation result preferably describes an impulse response on each subcarrier. Since the received symbols should in an ideal situation precisely correspond with the predetermined reference symbols, the deviations of the symbols from one another estimate the distortions caused by the channel to the signal transmitted at the reference frequency and to the data signal. The channel estimate is preferably formed by thresholding the correlation and by calculating the Fourier transform from the thresholded correlation, whereby the correlation is transformed to a frequency space and frequency-specific/subcarrier-specific channel estimates are obtained. The channel estimate can be formed symbol by symbol or averaged over several temporally consecutive symbols. Convolution integral transforms are herein realized as equivalent transforms to the Fourier transform; examples of the convolution integral transforms are Laplace and Z transforms, by which the solution of the invention can be implemented.

Figure 2:
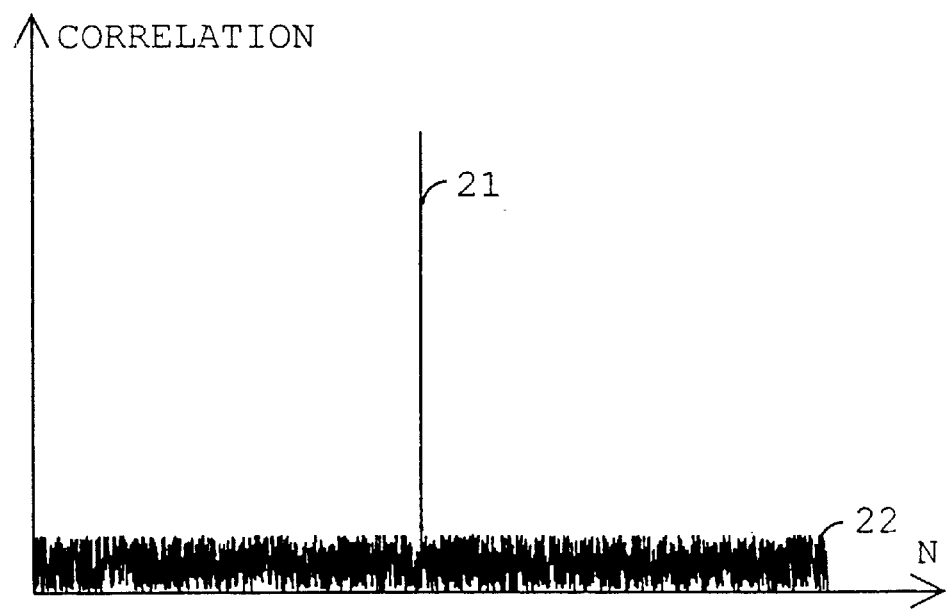
FIG. 2 shows an auto-correlation of an OFDM symbol.

FIG. 2 shows an auto-correlation of the OFDM symbol, when there are N=2048 possible reference carrier frequencies in the frequency band and P=128 used reference carriers. The reference carriers are preferably generated by a common formula $f_n=(af_{n-1}+b)$ mod N, where a and b are constants. Here a is a=13, b is b=511 and the generating formula is thus $f_n=(13f_{n-1}+511)$ mod 2048. An initial value is $f_{n-1}=0$. An auto-correlation $r_{xx}$ is in its general mode calculated from variable x, which can be an OFDM symbol, as follows:

$$r_{xx}(\Delta) = \sum_{i=0}^{Q-1} x_i \cdot x^*_{i+\Delta}, \qquad (5)$$

where Q is preferably the number of symbols and * denotes a complex conjugate. A cross-correlation $r_{xy}$ is calculated as shown in formula (5), but in the formula either of variables $x_i$ or $x^*_{i+\Delta}$ is replaced with a variable $y_i$ or $y^*_{i+\Delta}$ deviating from variable x. When the symbols correlate a correlation peak 21 is formed, the value of the correlation peak being based directly on the number P of the subcarriers used. If there is transition between the symbols, i.e. $\Delta \neq 0$ and the frequencies $f_n$ are evenly distributed into the band in use, the expected value of the auto-correlation is closer to 0 when the number of symbol elements is greater. The symbol elements are preferably bits which are mapped in a previously known manner to values −1 and 1. Deviation from 0, i.e. $\Delta \neq 0$, forms a theoretical noise-like behaviour which is shown as a level 22. The formed correlation of the received signal is thresholded so that it cuts off the theoretical noise 22, but leaves the actual noise formed in the channel behind.

In the general mode, the Fourier transform and inverse Fourier transform are calculated as an integral in the following way:

$$\mathcal{F}\{f(t)\} = F(\omega) = \frac{1}{\sqrt{2\Pi}} \int_{-\infty}^{\infty} f(t)e^{-i\omega t} dt, \qquad (6)$$

$$\mathcal{F}^{-1}\{F(\omega)\} = f(t) = \frac{1}{\sqrt{2\Pi}} \int_{-\infty}^{\infty} F(\omega)e^{i\omega t} dt,$$

where f denotes Fourier transform, $f^{-1}$ denotes inverse Fourier transform, f(t) is a function of time t, F(ω) is a Fourier transformed function, ω is a frequency variable, i is an imaginary unit and π denotes number pi. Both Fourier transform integrals are calculated in the digital system by summation where N terms to be summed are included. However, the number of operations in the FFT transform and IFFT transform (Fast Fourier Transform and Inverse Fast Fourier Transform) has been considerably reduced. The Fourier transform conventionally requires $W^2$ operations but the FFT transform can preferably be performed with $W*\log_2(W)$ operations (Danielson-Lanczos theorem), where W denotes the number of elements in the transform. Since the length of the impulse response of the subcarriers calculated by correlation is limited, it causes zeros to the FFT input data signal calculating the channel estimate. This can preferably be taken into account in the inventive solution and calculate the partial FFT transforms. Thus, unnecessary operations are avoided.

The correlation can also be calculated as a FIR filtering or convolution, when the second variable to be calculated is a constant. The convolution, in turn, can be calculated as multiplication in the Fourier-transformed frequency space. This is preferable particularly when the number of reference carriers is great. After multiplication the product is inverse-transformed back to time space. The use of Fourier transform is preferable since the correlation requires O $(W^2)$ operations, but the Fourier transform only O (W log W), where the operator O indicates the complexity of the algorithm, or the 'degree'.

A FIR filter for calculating a correlation is in the most simple form a shift register, the contents of each register element in the shift register being weighted by a tap multiplier and summed. At time level the output y(t) of the FIR filter can be shown as the formula $$y(t) = \sum_{k=0}^{M-1} h(k)x(t - k\Delta t), \qquad (7)$$

where h(k) is a tap multiplier of tap k, Δt is delay and x is a variable. Formula (7) is similar to the convolution formula. Furthermore, zero is set as an amplitude of data carriers in the reference signal, whereby the effect of the actual information transmitted in the data signal on the cross-correlation result is avoided in the inventive solution.

Figure 3:
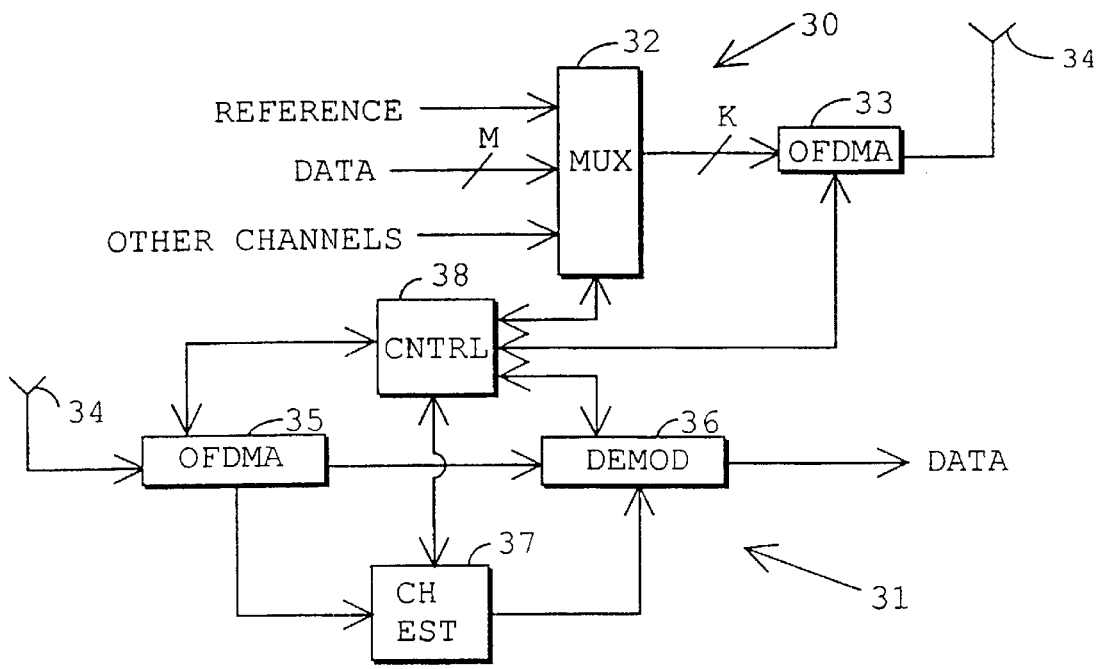
FIG. 3 is a flow chart of a transmitter and a receiver and FIG. 4 is a flow chart of a channel estimator of a receiver.

Let us now examine in greater detail the transmitter and receiver of the radio system of the invention. A transmitter 30 in FIG. 3 comprises a multiplexer 32, means to OFDM-modulate 33 and an antenna 34. A receiver 31 in FIG. 3 comprises an antenna 34, means to OFDM-demodulate 35, means to detect 36, means 37 to form a channel estimate and control means 38. The transmitter 30 and receiver 31 implement the inventive method. A sequence to be transmitted is selected by the multiplexer 32, the sequence being for example a data symbol sequence or reference symbol sequence. Predetermined K symbols of the reference sequence are modulated by K subcarriers in the means 33 which is an OFDMA modulator. The OFDMA modulator of the invention places the reference carriers randomly into the band in use by using the method of the invention. A sum signal modulated by subcarriers is transmitted according to prior art through the antenna 34.

When the antenna 34 of the receiver receives signals the means 35 release the desired signal or the subcarrier modulation of the signals preferably by the FFT transform. The means 36 indicate the demodulated signal according to prior art. The means 37 form a channel estimate which is utilized when the signal is being detected in the means 36. The control means 38 preferably control the operation of the transmitter 30 and receiver 31.

Figure 4:
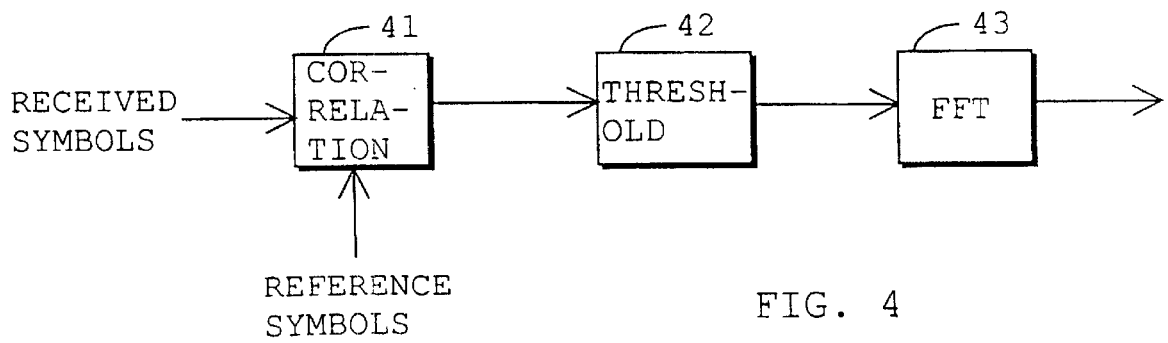

FIG. 4 shows a more detailed flow chart of the means 37. The means 37 i.e. the channel estimator comprises a correlator 41, threshold means 42 and means 43 to form a Fourier transform. A correlation between a signal and a reference signal is calculated in the correlator 41. This takes place as a direct correlation calculation as shown in formula (5), as an inverse Fourier transform of the inputs of Fourier-transformed signals or as a FIR filtering as shown in formula (7). The correlation is thresholded in the means 42 because by thresholding a theoretical interference level 22 can be removed and the number of actual interferences can be detected. The Fourier transform, which is preferably an FFT transform, is formed by the means 43. A Fourier-transformed correlation result represents the channel estimate.

Even though the invention has above been described with reference to the example of the accompanying drawings, it is obvious that the invention is not restricted to it but can be modified in various ways within the scope of the inventive idea disclosed in the attached claims.

What is claimed is:

1. A data transmission method used in a radio system comprising at least one base station (1) and a subscriber terminal (2–4) which modulate a signal to be transmitted on subcarriers of an orthogonal multicarrier modulation and transmit a reference signal (6–8) in a band in use by using reference carriers formed by the multicarrier modulation, characterized in that the reference carriers are substantially randomly placed in the band in use;

the reference carriers have a reference number; and the reference carriers are placed in the band in use by using a linear congruential generation formula based on iteration:

$$f_n = (af_{n-1} + b) \bmod N,$$

where a and b are constants, N is a maximum amount of carriers in the band in use, $f_n$ is a determining reference number of a desired reference carrier and $f_{n-1}$ is a determining reference number of the desired reference carrier formed during previous iteration and as an initial value the reference number $f_{n-1}$ has a freely selected value.

2. A method as claimed in claim 1, characterized in that the reference carriers are evenly placed in the band in use.

3. A method as claimed in claim 1, characterized in that the reference carriers have a reference number and the reference carriers are selected for the band in use by using an M sequence in such a manner that the predetermined consecutive bits of the M sequence form a determining reference number of the reference carrier.

4. A method as claimed in claim 1, characterized in that the reference carriers are frequency hopped.

5. A data transmission method used in a radio system comprising at least one base station (1) and a subscriber terminal (2–4) which modulate a signal to be transmitted on subcarriers of an orthogonal multicarrier modulation and transmit a reference signal (6–8) in a band in use by using reference carriers formed by the multicarrier modulation, characterized in that the reference carriers are substantially randomly placed in the band in use;

when an OFDM signal comprising a predetermined reference symbol is transmitted on, the reference carriers the channel estimate is formed by calculating a correlation between a symbol of the received OFDM signal and the predetermined reference symbol, by thresholding the correlation and by calculating a Fourier transform from the thresholded correlation, and the correlation is calculated by Fourier transforming the received OFDM signal symbol and the reference symbol, by multiplying the Fourier-transformed received symbol of the reference carriers and the reference symbol with one another, and by inverse Fourier transforming the Fourier-transformed and multiplied received symbol of the reference carriers and the reference symbol.

6. A radio system comprising at least one base station and a subscriber terminal comprising a transmitter (30) and a receiver (31) arranged to modulate a signal to be transmitted on subcarriers using orthogonal multicarrier modulation and to transmit and receive a reference signal which is multicarrier modulated on reference carriers, characterized in that the transmitter (30) of the radio system is arranged to substantially randomly place the reference carriers into a band in use;

the reference carriers have a reference number; and the transmitter (30) is arranged to place the reference carriers in the band in use by using a linear congruential generation formula based on iteration:

$$f_n = (af_{n-1} + b) \bmod N,$$

where a and b are constants, N is a total amount of reference carriers in the band in use, $f_n$ is a reference number determining the frequency of a desired reference carrier and $f_{n-1}$ is a reference number determining the frequency of the desired reference carrier formed during previous iteration and an initial value for the reference number $f_{n-1}$ can be freely selected.

7. A radio system as claimed in claim 6, characterized in that the transmitter (30) is arranged to place the reference carriers evenly in the band in use.

8. A radio system as claimed in claim 6, characterized in that the reference carriers have a reference number and the transmitter (30) is arranged to place the reference carriers in the band in use by using an M sequence in such a manner that the predetermined consecutive bits of the M sequence form the reference number determining the frequency of the reference carrier.

9. A radio system as claimed in claim 6, characterized in that the transmitter (30) is arranged to frequency hop the reference carriers.

10. A radio system comprising at least one base station and a subscriber terminal comprising a transmitter (30) and a receiver (31) arranged to modulate a signal to be transmitted on subcarriers using orthogonal multicarrier modulation and to transmit and receive a reference signal which is multicarrier modulated on reference carriers, characterized in that the transmitter (30) of the radio system is arranged to substantially randomly place the reference carriers into a band in use;

the receiver (31) is arranged to form a channel estimate of the subcarriers utilizing the reference carriers for coherent detection;

when the transmitter (30) transmits an OFDM signal comprising a predetermined reference symbol on the reference carriers the receiver (31) is arranged to form the channel estimate by calculating a correlation between the received OFDM signal symbol and the reference symbol, by thresholding the correlation and by calculating a Fourier transform from the thresholded correlation; and the receiver (31) is arranged to calculate the correlation by Fourier-transforming the OFDM signal symbol and the reference symbol by multiplying the Fourier-transformed reference carrier symbol and the reference symbol with one another, and by inverse Fourier transforming the Fourier-transformed and multiplied reference carrier symbol and the reference symbol.

* * * * *